(12) United States Patent
Sugaya

(10) Patent No.: US 8,700,960 B2
(45) Date of Patent: Apr. 15, 2014

(54) DIAGNOSTIC CODE GENERATION TERMINAL, DIAGNOSTIC METHOD AND PROGRAM FOR DIAGNOSTIC CODE GENERATION TERMINAL

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 81 days.

(21) Appl. No.: 13/251,648

(22) Filed: Oct. 3, 2011

(65) Prior Publication Data

US 2013/0080833 A1    Mar. 28, 2013

(30) Foreign Application Priority Data

Sep. 23, 2011   (JP) .................................. 2011-208246

(51) Int. Cl.
*G06F 11/00*   (2006.01)
(52) U.S. Cl.
USPC .......................................................... 714/46
(58) Field of Classification Search
USPC .......................................................... 714/46
See application file for complete search history.

(56) References Cited

U.S. PATENT DOCUMENTS

| | | | |
|---|---|---|---|
| 6,223,272 B1 * | 4/2001 | Coehlo et al. ...................... | 712/1 |
| 6,279,123 B1 * | 8/2001 | Mulrooney ...................... | 714/35 |
| 7,257,741 B1 * | 8/2007 | Palenik et al. ................... | 714/43 |
| 7,451,358 B2 * | 11/2008 | Grey et al. ....................... | 714/45 |
| 2004/0153823 A1 * | 8/2004 | Ansari .............................. | 714/38 |
| 2011/0208470 A1 * | 8/2011 | Yasuda et al. .................. | 702/123 |
| 2011/0296384 A1 * | 12/2011 | Pasternak ....................... | 717/124 |

FOREIGN PATENT DOCUMENTS

| | | | |
|---|---|---|---|
| JP | 2003006062 A | | 1/2003 |
| JP | 2005228004 A | | 8/2005 |
| JP | 2011034315 A | | 2/2011 |

* cited by examiner

*Primary Examiner* — Yair Leibovich
(74) *Attorney, Agent, or Firm* — BainwoodHuang

(57) ABSTRACT

The diagnostic method is provided with no leakage of user's private information, less errors in reproduction of the setting status, and no performing of useless diagnoses. Input from a user is received by outputting a select object for limiting a diagnosis item of the diagnostic code generation terminal 10 to the diagnostic code generation terminal 10, a diagnosis item corresponding to the select object is determined in accordance with the input from the user, and performing diagnosis of the determined diagnosis item is performed. Then, a diagnostic code reflecting the result of the performed diagnosis is generated, and the setting status of the diagnostic code generation terminal 10 is reproduced by inputting the diagnostic code from an operator terminal 150. Even when a diagnostic code is repeatedly generated, information on the past diagnostic code is included in the next diagnostic code, and thus useless diagnosis processes are reduced.

10 Claims, 11 Drawing Sheets

Fig.4

<BASIC DIAGNOSIS CONTENT LIST>

| BASIC DIAGNOSIS ITEM | | DIAGNOSIS CONTENT | DIAGNOSTIC RESULT | DIGIT NUMBER |
|---|---|---|---|---|
| COMMUNICATION STATUS | 1 | Wi-Fi SETTING | ON:1, OFF:0 | 1 |
| | 2 | INCOMING SIGNAL STRENGTH | YES:1, NO:0 | 2 |
| | 3 | INTERNET ACCESSIBILITY | YES:1, NO:0 | 3 |
| BASIC SETTING | 1 | POWER SAVING BASIC SETTING | SETTING 1~4 | 4,5 |
| | 2 | SOUND BASIC SETTING | SETTING 1~4 | 6,7 |
| | 3 | ACCESS CONTROL SETTING | ON:1, OFF:0 | 8 |

Fig.5

<Wi-Fi DIAGNOSIS CONTENT LIST>

| DIAGNOSIS ITEM | | DIAGNOSIS CONTENT | DIAGNOSTIC RESULT | DIGIT NUMBER |
|---|---|---|---|---|
| Wi-Fi | 1 | Wi-Fi SETTING | ON:1, OFF:0 | 100 |
| | 2 | ACCESSIBLE SSID | YES:1, NO:0 | 101 |
| | 3 | HTTP PROXY SETTING | ON:1, OFF:0 | 102 |

Fig.6

<N=1 SELECT OBJECT LIST>

| | N=1 DIAGNOSIS ITEM |
|---|---|
| 1 | Wi-Fi |
| 2 | BASIC SETTING |
| 3 | E-MAIL |
| 4 | HARDWARE |
| 5 | OS |
| 6 | APPLICATION |

<BASIC DIAGNOSTIC CODE OUTPUT SCREEN>

<N=1 SELECT OBJECT OUTPUT SCREEN>

<FIRST DIAGNOSTIC CODE OUTPUT SCREEN>

<SECOND DIAGNOSTIC CODE OUTPUT SCREEN>

<SETTING STATUS REPRODUCTION PROCESS>

<SELECTED ITEM DIAGNOSIS PROCESS>

<DIAGNOSTIC CODE REGENERATION PROCESS>

<DELETED DIAGNOSIS ITEM CORRESPONDING LIST>

| DIAGNOSIS ITEM | DELETED DIAGNOSIS ITEM | |
|---|---|---|
| WiFi | E-MAIL | APPLICATION |
| HARDWARE | APPLICATION | |
| OS | APPLICATION | |

Fig.16

<(N+1)TH SELECT OBJECT EXTRACTION PROCESS>

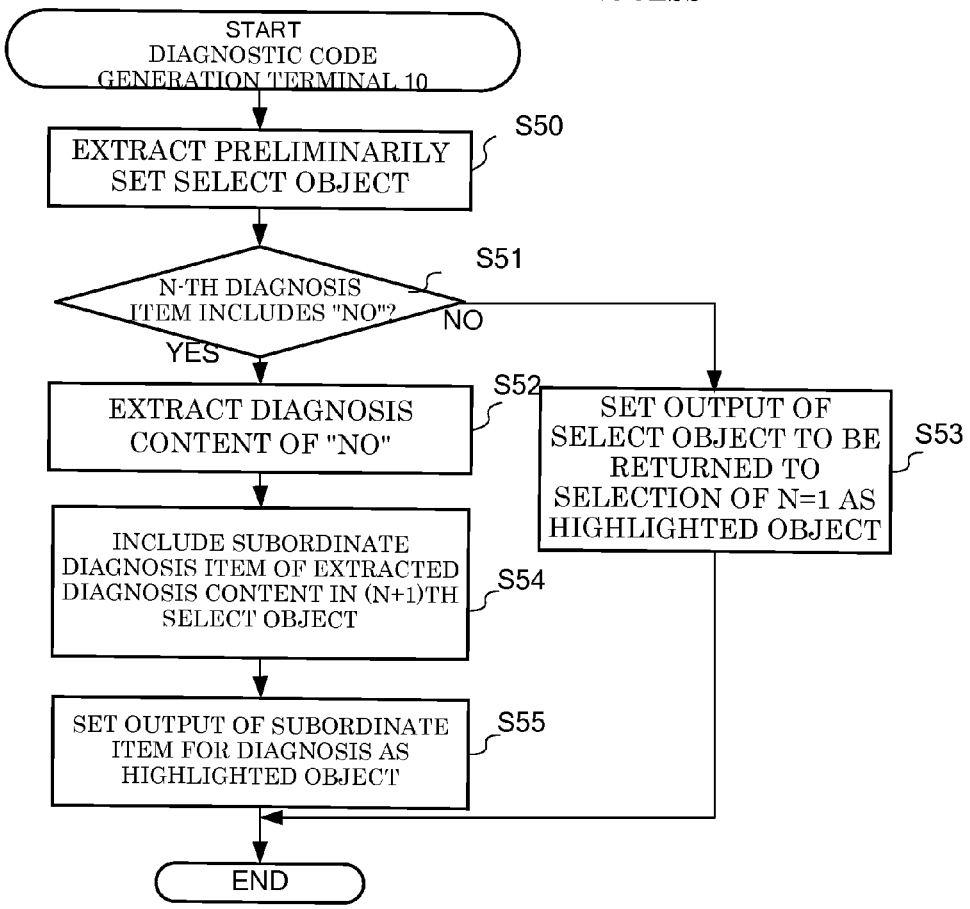

Fig.17  < DIAGNOSIS ITEM LIST >

|   | FIRST DIAGNOSIS ITEM |   | SECOND DIAGNOSIS ITEM |   | THIRD DIAGNOSIS ITEM |
|---|---|---|---|---|---|
| 1 | Wi-Fi | 1 | SSID | 1 | SECURITY SETTING DETAIL |
|   |   |   |   | 2 | DHCP DETAIL |
| 2 | BASIC SETTING | 1 | POWER SAVING SETTING DETAIL |   |   |
|   |   | 2 | SOUND SETTING DETAIL |   |   |
|   |   | 3 | ACCESS CONTROL DETAIL |   |   |
| 3 | E-MAIL | 1 | ACCOUNT SETTING | 1 | SMTP DETAIL |
|   |   |   |   | 2 | POP DETAIL |
|   |   |   |   | 3 | AUTHENTICATION METHOD DETAIL |
| 4 | HARDWARE | 1 | CPU DETAIL |   |   |
|   |   | 2 | MEMORY DETAIL |   |   |
|   |   | 3 | TOUCH PANEL MODULE |   |   |
|   |   | 4 | GPS MODULE |   |   |
| 5 | OS | 1 | REGISTRY DETAIL |   |   |
| 6 | APPLICATION | 1 |   |   |   |

DIAGNOSTIC CODE GENERATION TERMINAL, DIAGNOSTIC METHOD AND PROGRAM FOR DIAGNOSTIC CODE GENERATION TERMINAL

This application is based on and claims the benefit of priority from Japanese Patent Application No. 2011-208246, filed on 23 Sep. 2011, the content and teachings of which are incorporated herein by reference.

TECHNICAL FIELD

The present invention relates to a diagnostic code generation terminal, a diagnostic method, and a program for the diagnostic code generation terminal that utilize a diagnostic code used for remotely supporting a smart phone, a personal computer, and the like.

BACKGROUND ART

In recent years, various services have been provided for users by connecting portable terminals with a web server and the like through a public line network. In particular, advanced services, which have been provided for personal computers conventionally, has become possible to provide for mobile phones by the appearance of smart phones (highly functional mobile phones).

In order to maximize the use of such advanced web services and the high functionality of smart phones, users need to know the operation of configuration and the function of a smart phone. In addition, if users who are not used to the operation configure their own terminals for the first time, configuration information that should not be deleted may actually be deleted, or inappropriate configuration may be set to cause an error.

For approaching such problems, there has been a known method of remotely supporting (remote maintain) a user's terminal from a system so as to remotely configure the user's terminal and so as to remotely login the user's terminal to change the settings and to guide the setting operation. For example, PLT 1 discloses that a server acquires the screen information of each client to be supported and constantly displays a list of this screen information so as to improve the performance of support and monitoring for a user.

In addition, PLT 2 discloses the technology capable of remote support by transferring the screen information of a user terminal through the use of augmented reality achieved by means of the camera of a mobile phone.

CITATION LIST

Patent Literature

PLT 1: Japanese Unexamined Patent Application 2003-6062
PLT 2: Japanese Unexamined Patent Application 2011-34315
PLT 3: Japanese Unexamined Patent Application 2005-228004

SUMMARY OF INVENTION

However, in the case of remote support by transferring user's screen information in this way, transferring user's private information as screen information may allow the operator side to view this private information. Specifically, an operator may know user's data such as user's ID, password, interest, and the like.

In addition, when allowed to login from an operator terminal to a user terminal through remote login or the like and operate the user terminal, an operator can freely manipulate data in the user terminal. As a result, a user may not notice if an operator views and replicates the data. Such a user's anxiety may prevent an explosive boom of the remote support system.

Furthermore, in transferring user's screen information and remote support conducting remote login, users cannot receive support while offline. A user wishes to receive remote support required for communication, but diagnosis for recovering from the failure may not be able to be started during communication failure.

Then, some of the present improvements focus attention to high needs of the system allowing an operator to know the setting status of the user terminal without transferring screen information of the user terminal while the user is offline.

As a similar technology, the remote maintenance method using error codes has been conventionally known (for example, PLT 3). This patent literature discloses that the error diagnosis of a user terminal is performed to generate an error code corresponding to an error and display the content of the error based on the error code on a maker terminal, thereby allowing an operator to know the error status and recover from it. Since such a system using error codes generates a code indicating only the content of an error after diagnosis, the digit number of an error code itself does not become too long.

Unlike the error code, when the items to diagnosed increase, a diagnostic code for knowing the status of the user terminal tends to be increased. In general, since devices and functions have been increased by highly sophisticated user terminals such as smart phones, the items to be diagnosed have also been increased. This leads to the increase of the digit number of a diagnostic code reflecting the setting status of a user terminal, thereby making the handling of a diagnostic code difficult. For example, in the case in which the user reads a diagnostic code aloud through phone or the like, the user may misread the code if it is too long, resulting in a wrong diagnosis.

Then, in accordance with some of the present arrangements, the system is capable of allowing an operator to know the status of the user terminal by using a diagnostic code and of decreasing the digit number thereof.

In addition, in the method of PLT 3, it takes a long time to wait for the completion of the error check module because many devices and modules of the user terminal are scanned in order to identify an error. In particular, when an operator provides support through phone, the support time is required to be reduced. Therefore, it is desirable to eliminate useless checks for a user terminal.

An object of the present invention is to provide a diagnostic code generation terminal, a diagnostic method, and a program for a diagnostic code generation terminal, in which no private information of the user terminal is leaked unlike screen transfer, errors in reproduction of the setting status less likely occur, and no useless diagnoses are performed, in order to check the setting status of a user terminal.

According to a first aspect of the present invention, the diagnostic method capable of reproducing the setting status of a diagnostic code generation terminal at an operator side includes the steps of:

receiving input from a user by outputting a select object for limiting a diagnosis item of the diagnostic code generation terminal to the diagnostic code generation terminal;

determining a diagnosis item corresponding to the select object in accordance with the input from the user and performing diagnosis of the determined diagnosis item;

generating a diagnostic code reflecting the result of the performed diagnosis; and reproducing the setting status of the diagnostic code generation terminal by inputting the diagnostic code to an operator terminal.

According to the first aspect of the present invention, input from a user is received by outputting a select object for limiting a diagnosis item of the diagnostic code generation terminal to the diagnostic code generation terminal; and a diagnosis item corresponding to the select object is determined in accordance with the input from the user, and diagnosis of the determined diagnosis item is performed. Then, a diagnostic code reflecting the result of the performed diagnosis is generated; and the setting status of the diagnostic code generation terminal is reproduced by inputting the diagnostic code to an operator terminal.

Accordingly, a diagnostic result is generated as a diagnostic code to check the setting status of a user terminal at the operator side. Then, the diagnostic method can be provided, in which step by step diagnosis can be performed, the digit number of the diagnostic code is reduced, and no useless diagnoses are performed, by way of limiting a diagnosis item by the select object. As a result, the present invention can provide a diagnostic code generation terminal capable of diagnosis even if the user is offline, in which no private information of the user terminal is leaked unlike screen transfer, errors in reproduction of the setting status less likely occur, and no useless diagnoses are performed, in order to check the setting status of a user terminal.

In categories of the invention, a diagnostic code generation terminal and a program have functions and effects similar to those of the diagnostic method according to the first aspect of the present invention.

According to a second aspect of the present invention, in the diagnostic method according to the first aspect of the present invention, in the step of receiving input from a user, after performing one diagnosis, input is received from the user by outputting a corresponding select object so as to perform diagnosis of a subordinate diagnosis item of the one diagnosis.

In categories of the invention, a diagnostic code generation terminal and a program have functions and effects similar to those of the diagnostic method according to the second aspect of the present invention.

According to a third aspect of the present invention, in the diagnostic method according to the first aspect of the present invention, in the step of receiving input from the user, after performing one diagnosis when the diagnosis result has a problem, input is received from a user by outputting a corresponding select object so as to perform diagnosis of a subordinate diagnosis item of the one diagnosis.

Thus, when the diagnosis result has a problem after performing one diagnosis, a user is prompted to select a detailed diagnosis of the diagnosis item with a problem by outputting a select object corresponding to a subordinate diagnosis item that is a detail diagnostic item of the one diagnosis.

According to a fourth aspect of the present invention, in the diagnostic method according to the first aspect of the present invention, the step of generating a diagnostic code includes the step of regenerating a diagnostic code including information on the past diagnosis by adding the result of the diagnosis to the generated diagnostic code.

Thus, even if multiple diagnoses are performed in a diagnostic code generation terminal, a new diagnostic code succeeding the past diagnostic code can be regenerated. When multiple diagnoses are performed, a diagnostic code is generated each time. For this reason, if information on the diagnostic code of the past diagnosis is not succeeded, the past diagnostic result becomes useless. On the other hand, a diagnostic code including information on the past diagnostic code is regenerated by adding the result of the diagnosis to the generated diagnostic code so that a diagnostic code not wasting the past diagnosis can be generated.

The present invention can provide a diagnostic code generation terminal and a diagnostic method, and a program for a diagnostic code generation terminal, in which a diagnostic result is generated as a diagnostic code, the digit number of this diagnostic code is reduced, and no useless diagnoses are performed, in order to check the setting status of a user terminal.

BRIEF DESCRIPTION OF DRAWINGS

FIG. 4 shows the basic diagnosis content list stored in a diagnostic code generation terminal 10;

FIG. 5 shows the Wi-Fi diagnosis content list stored in a diagnostic code generation terminal 10;

FIG. 6 shows the N=1 select object list stored in a diagnostic code generation terminal 10;

FIG. 16 shows the flow chart illustrating the (N+1)th select object extraction process executed by a diagnostic code generation terminal 10;

FIG. 17 shows a diagnosis item list stored in a diagnostic code generation terminal 10;

DESCRIPTION OF EMBODIMENTS

Hereinafter, a best mode of the present invention will be described with reference to the attached drawings. However, this is illustrative only, and the technological scope of the present invention is not limited thereto.

Configuration of Diagnostic Code Generation System

Figure 1:
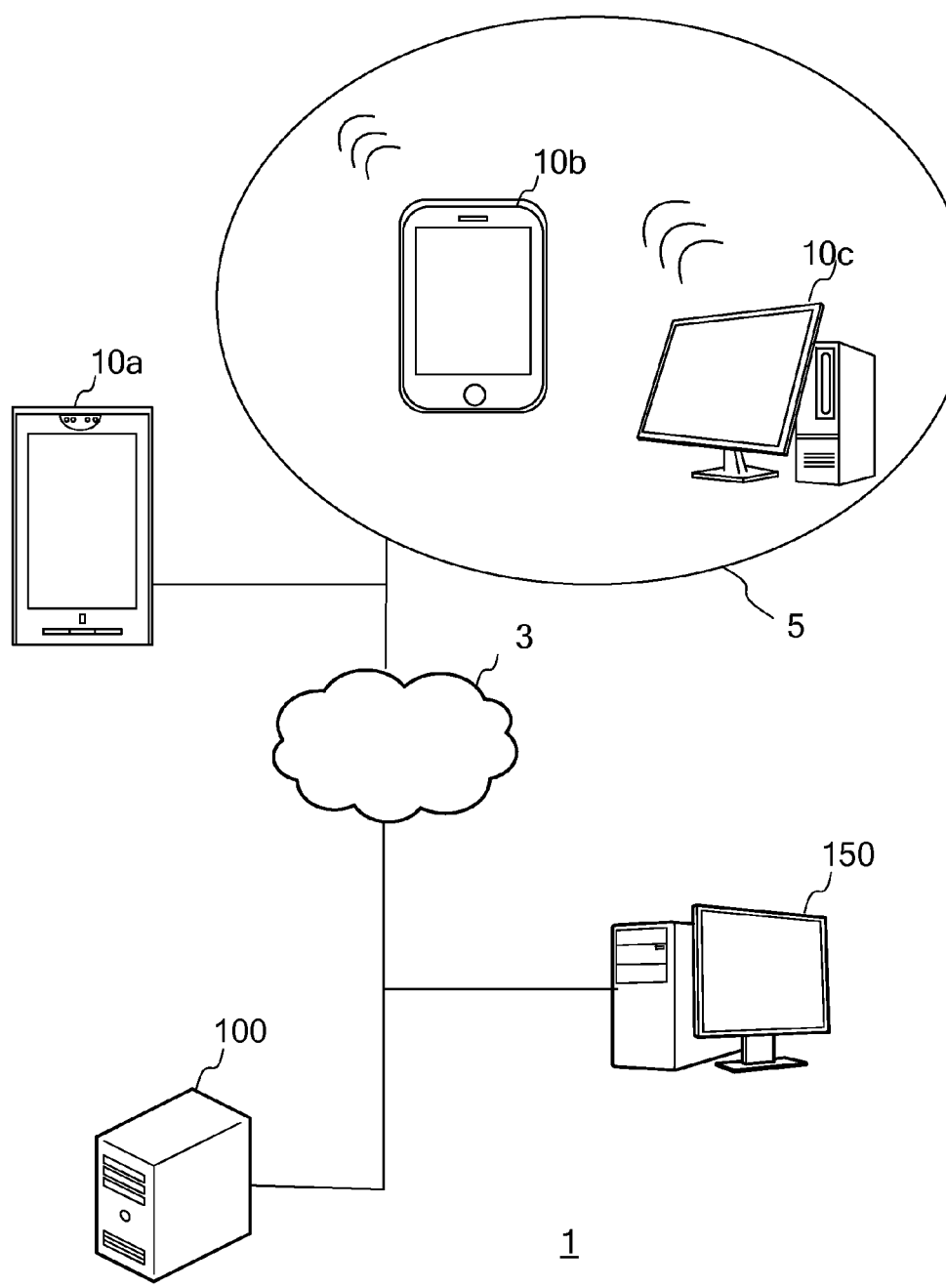
FIG. 1 shows the overall schematic diagram of a diagnostic code generation system 1.

FIG. 1 is the system configuration diagram of a diagnostic code generation system 1 that is a preferred embodiment of the present invention. The diagnostic code generation system 1 includes diagnostic code generation terminals 10a, 10b, and 10c (hereinafter simply referred to as "diagnostic code generation terminal 10"), a public line network 3 (e.g., an Internet network, a third generation communication network, a fourth generation communication network, etc.), and an operator terminal 150 (remote terminal). The operator server 100 is not an indispensable component as described hereinafter.

The diagnostic code generation terminal 10 and the operator terminal 150 or the operator server 100 each may be connected with a public line network 3. Enabling data communication between the diagnostic code generation terminal 10 and the operator terminal 150 or the operator server 100 is not a requisite element of the present embodiment. Specifically, in the first embodiment executing the below-mentioned diagnostic code generation process (FIG. 3), the diagnostic code generation terminal 10 may not enable data communication with the operator terminal 150 or the operator server 100 (, but voice communication is desirably possible). On the other hand, in the second embodiment and the third embodiment executing the diagnostic code generation process 2 (FIG. 18), it is required that the diagnostic code generation terminal 10 enable data communication with the operator terminal 150 or the operator server 100. In this case, the operator terminal 150 is connected with the operator server 100 so as to enable data communication with each other.

Like the diagnostic code generation terminals 10b and 10c, the diagnostic code generation terminal 10 may be connected with a public line network 3 through a local area network 5. Alternatively, like the diagnostic code generation terminal 10a, the diagnostic code generation terminal 10 may communicate with a base station through radio waves so as to connect with a public line network 3 through the base station connected with an exchanger, without a local area network 5.

The diagnostic code generation terminal 10 may be a general information terminal used by users, which is an information technology device or an electric appliance, which is provided with the below-mentioned functions including a verbal communication function. The diagnostic code generation terminal 10 may be, for example, a smart phone 10a, a slate terminal 10b, a personal computer 10c, and a mobile phone, or may be general information appliances such as a home phone, a net book terminal, an electronic book terminal, and an electronic dictionary terminal.

The operator terminal 150 is an information terminal such as a general personal computer used by an operator who provides support for a diagnostic code generation terminal 10.

Functions

Figure 2:
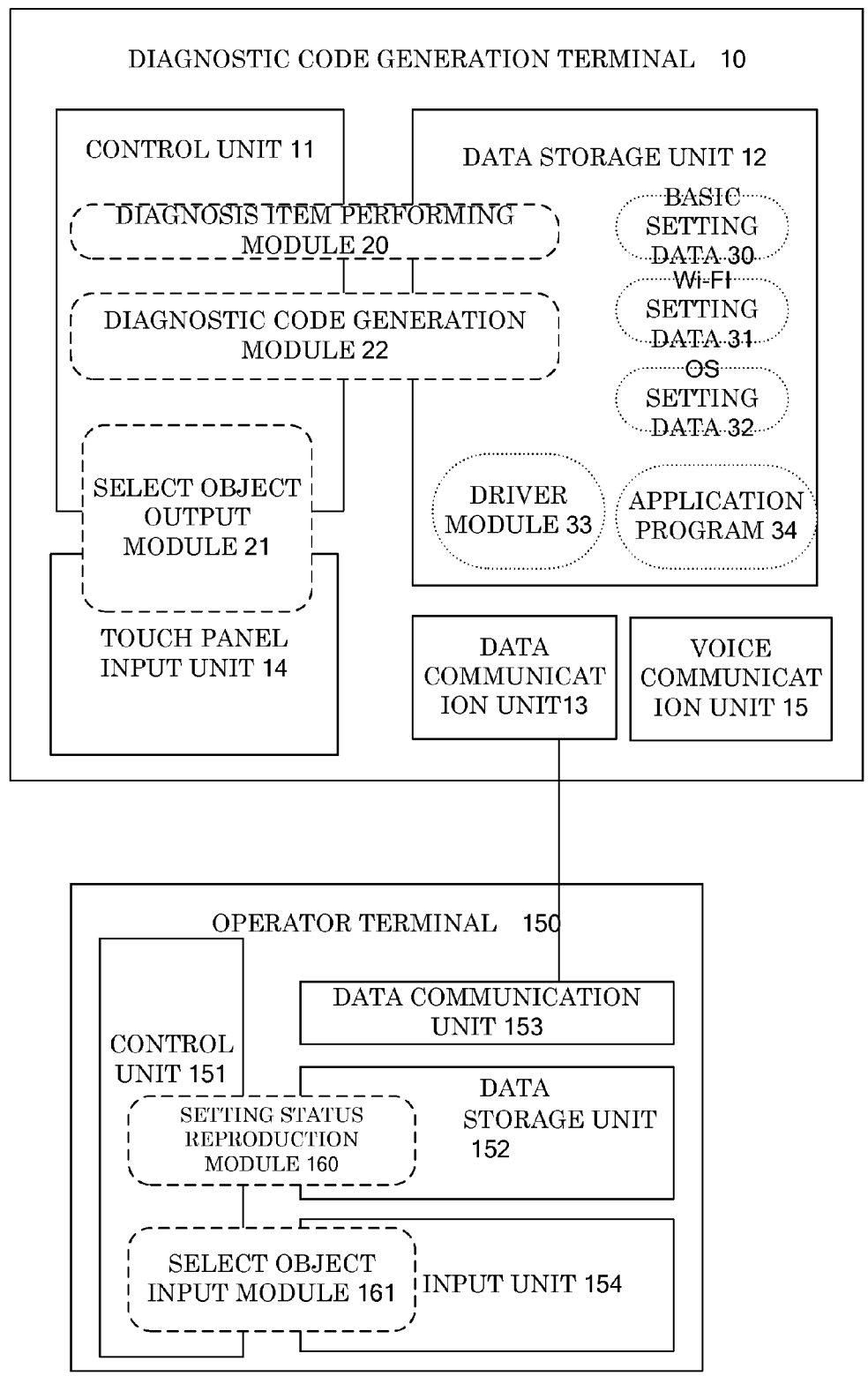
FIG. 2 shows the functional block diagram of a diagnostic code generation terminal 10 and an operator terminal 150.

FIG. 2 shows the functional block diagram of a diagnostic code generation terminal 10 and an operator terminal 150. The function and hardware setting of each device will be explained with reference to FIG. 2.

The diagnostic code generation terminal 10 is a terminal to be diagnosed, which is used by general users. If only provided with a control unit 11, a data storage unit 12, a data communication unit 13, a touch panel input unit 14, and a voice communication unit 15, the diagnostic code generation terminal 10 may be any of a home electrical appliance, a business electrical appliance, a portable terminal, and a business terminal.

Diagnosis in the present embodiment is a process for obtaining the status of the diagnostic code generation terminal 10, for example, which may obtain the setting status of the diagnostic code generation terminal 10 and may further include the error status of the hardware or the software.

The control unit 11 include a central processing unit (hereinafter referred to as "CPU"), a random access memory (hereinafter referred to as "RAM"), and a read only memory (hereinafter referred to as "ROM"), and the like; and the data communication unit 13 includes a Wireless Fidelity® or WiFi® enabled device complying with, for example, IEEE802.11; or a wireless device complying with the IMT-2000 standard such as the third generation mobile communication system, or the like. The communication unit 13 may include a wired device for LAN connection.

The data storage unit 12 includes any or all of an HDD (Hard Disk Drive), an SSD (Solid State Drive), a memory, and the like. In addition, the touch panel input unit 14 includes a display unit such as a liquid crystal monitor displaying images and text messages; and an input unit such as a touch panel receiving input from a user. The touch panel input unit 14 may be provided with a voice input unit.

The data storage unit 12 stores diagnosis content lists such as a basic diagnosis content list and a Wi-Fi diagnosis content list, an N-th diagnosis content list (N is 2 or more), an N=1 select object list, a diagnosis item list, and a deleted diagnosis item corresponding list as described hereinafter.

The data storage unit 12 stores data to be diagnosed. The data to be diagnosed is, for example, basic setting data 30 describing data on the basic setting of the diagnostic code generation terminal 10, Wi-Fi setting data 31 describing data on the settings of Wi-Fi, OS setting data 32 describing data on the setting of the operating system, a driver module 33 that is a hardware driver operable in the diagnostic code generation terminal 10, and an application program 34 that is a program for an application operable in the diagnostic code generation terminal 10.

In the case in which the data to be diagnosed is any of the setting data, for example, a predetermined setting value described in the setting data (which is a setting value desired to be reproduced in the operator terminal 150) is to be diagnosed. On the other hand, in the case in which the data to be diagnosed is a driver module 33 or a application program 34, for example, whether or not the driver module 33 or the application program 34, respectively, is normally installed is to be diagnosed.

The voice communication unit 15 is a device provided with an audio data receiving and output function receiving utterances with the other side (an operator) communicating with a user as digital signals to be heard by the user; and an audio data transmission function inputting user's utterances as digital signals and transmitting the user's utterances to a phone and the like of the other side as audio data.

The diagnostic code generation terminal 10 achieves a diagnosis item performing module 20 and a diagnostic code generation module 22 by the control unit 11 reading out a predetermined program from the data storage unit 12. The diagnostic code generation terminal 10 achieves a select object output module 21 by the control unit 11 cooperating with the touch panel input unit 14.

The operator terminal 150 is a terminal used by an operator who supports users. The operator terminal 150 may be a computer such as a general personal computer. The hardware setting of the operator terminal 150 may be the same as that of the diagnostic code generation terminal 10, and therefore the explanation is omitted. Unlike the diagnostic code generation terminal 10, the input unit 154 of the operator terminal 150 may be a general keyboard and a general monitor, without limiting to a touch panel.

Like the diagnostic code generation terminal 10, a data storage unit 152 stores diagnosis content lists such as a basic diagnosis content list and a Wi-Fi diagnosis content list, an N-th diagnosis content list (N is 2 or more), an N=1 select object list, a diagnosis item list, and a deleted diagnosis item corresponding list as described hereinafter.

The operator terminal 150 achieves the setting status reproduction module 160 by a control unit 151 cooperating with the data storage unit 152. The operator terminal 150 achieves a select object input module 161 by a control unit 151 cooperating with the data storage unit 152.

The operator server 100 is not an indispensable component of the present invention but may be a server relaying communication between the diagnostic code generation terminal 10 and the operator terminal 150. Similarly, the operator server 100 may also be provided with a control unit, a data storage unit, and a data communication unit to achieve the setting status reproduction module 160 by the control unit cooperating with the data storage unit.

If only achieved by the operator server 100, the setting status reproduction module 160 may not be provided in the operator terminal 150, and the present embodiment is thus achieved through so-called software as a service (hereinafter referred to as "SaaS"). In this case, the operator terminal 150 functions as an input/output terminal. Specifically, the operator server 100 receives a diagnostic code input to the operator terminal 150 and executes the below-mentioned setting status reproduction process based on this diagnostic code to reproduce the setting status. The operator terminal 150 receives and outputs this reproduced output result. The operator server 100 also relays data from the select object input module 161 achieved with the operator terminal 150 and transmits this data to the diagnostic code generation terminal 10.

Diagnostic Code Generation Process

Figure 3:
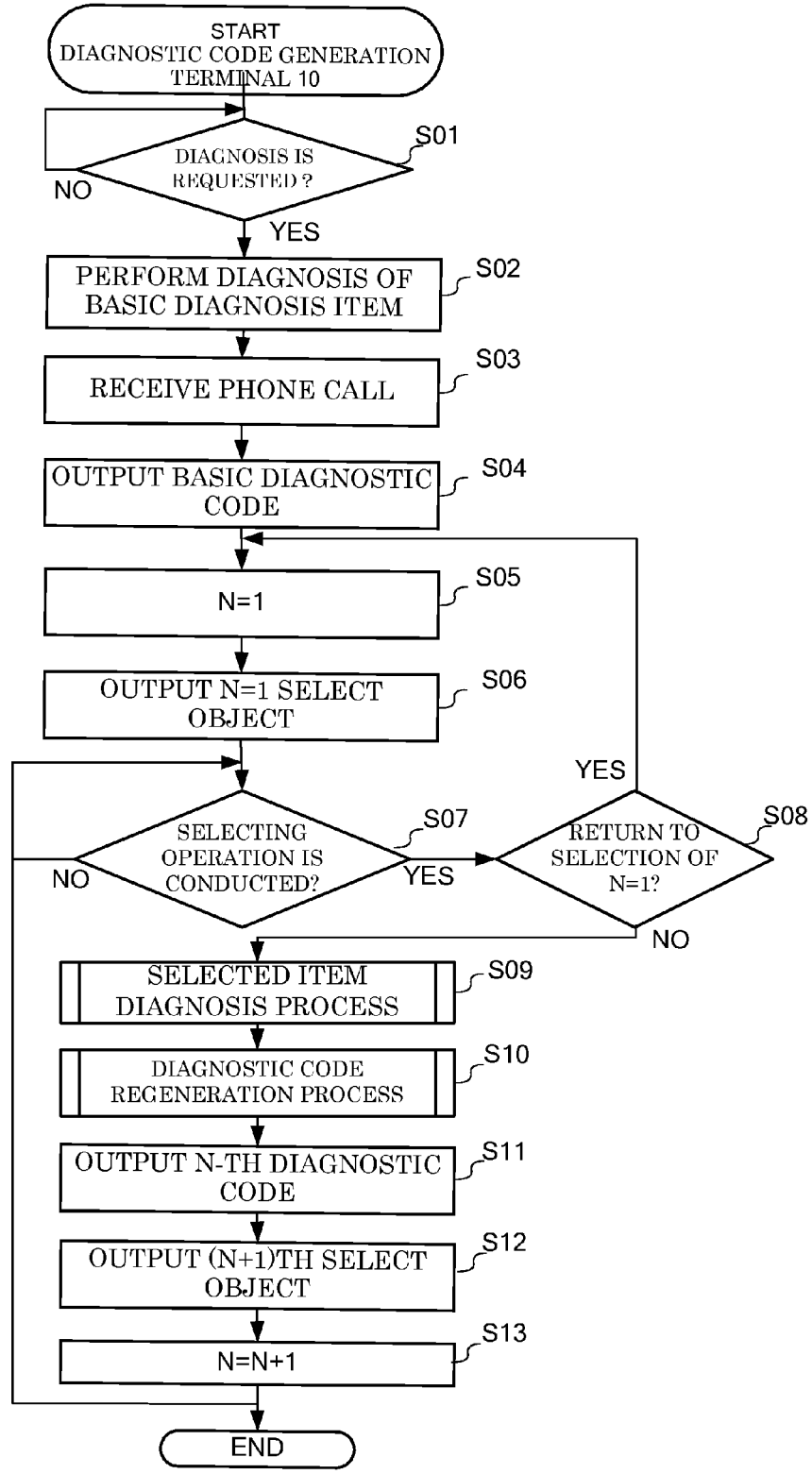
FIG. 3 shows the flow chart illustrating the diagnostic code generation process executed by a diagnostic code generation terminal 10.

FIG. 3 shows the flow chart illustrating the diagnostic code generation process executed by a diagnostic code generation terminal 10. At the start, the diagnostic code generation terminal 10 determines whether or not diagnosis of the diagnostic code generation terminal 10 is requested (Step S01). For example, when a user has a problem during the use of the diagnostic code generation terminal 10 and starts an application performing diagnosis, it is determined that diagnosis is requested by detecting the start of this application. Alternatively, when an error occurs in operation of the diagnostic code generation terminal 10, the diagnostic code generation terminal 10 may start an application performing diagnosis by itself. Even in this case, when an application performing diagnosis is started, it is determined that diagnosis is requested by detecting the start of this application.

If the diagnostic code generation terminal 10 determines that diagnosis of the diagnostic code generation terminal 10 is requested (Step S01: "YES"), the process is moved to the step S02. Until determining that diagnosis of the diagnostic code generation terminal 10 is requested (Step S01: "NO"), the diagnostic code generation terminal 10 repeats this process.

Then, the diagnosis item performing module 20 of the diagnostic code generation terminal 10 performs diagnosis of a basic diagnosis item (Step S02). The basic diagnosis item is a diagnosis item that is first performed when an application performing diagnosis is started, which checks the basic setting status of the diagnostic code generation terminal 10.

The basic diagnosis content list shown in FIG. 4 includes the diagnosis contents of each basic diagnosis item. In FIG. 4, as one example, "COMMUNICATION STATUS" and "BASIC SETTING" are provided as basic diagnosis items. The item, "COMMUNICATION STATUS" is composed of the three diagnosis contents, "Wi-Fi SETTING," "INCOMING SIGNAL STRENGTH," and "INTERNET ACCESSIBILITY." The diagnosis item performing module 20 of the diagnostic code generation terminal 10 executes diagnostic programs corresponding to these diagnosis contents to obtain the diagnostic result. The diagnosis item performing module 20 records the obtained diagnostic result, in relation to its diagnosis content, as well as generates a diagnostic code based on the diagnostic result.

For example, the diagnostic result of "Wi-Fi SETTING" is "ON" or "OFF" according to FIG. 4. If the execution result of this diagnostic program is "ON," the diagnosis item performing module 20 records the diagnostic result that "Wi-Fi SETTING" is "ON." If the execution result is "OFF," the diagnosis item performing module 20 records the diagnostic result that "Wi-Fi SETTING" is "OFF."

Then, binary numbers, "0" and "1" corresponding to the diagnostic result of a diagnosis content and the digit number thereof are referred to generate the diagnostic code. If the diagnostic result of "Wi-Fi SETTING" is "ON," "1" is generated in the first digit of the diagnostic code. If the diagnostic result is "OFF," "0" is generated in the first digit. Then, a diagnostic program corresponding to "INCOMING SIGNAL STRENGTH" is executed. If the diagnostic result of "INCOMING SIGNAL STRENGTH" is "YES," "1" is generated in the second digit of the diagnostic code. If the diagnostic result is "NO," "0" is generated in the second digit. As the digit number increases, a binary number is added to the right of the rightmost digit. For example, the diagnostic code with the first digit of "1" and the second digit of "0" is "10". By adding "0" to the third digit, this diagnostic code will be "100". In these two diagnostic results, "Wi-Fi SETTING" is "ON" and "INCOMING SIGNAL STRENGTH" is "NO," and the diagnostic code will therefore be "10." This process is executed for the basic diagnosis items, "COMMUNICATION STATUS" and "BASIC SETTING." According to FIG. 4, there are three diagnosis contents for each of "COMMUNICATION STATUS" and "BASIC SETTING." After these six diagnoses are performed, the diagnostic code is obtained in eight digits.

As one example, in addition to the diagnostic code "10," if "INTERNET ACCESSIBILITY" is "YES," "1" is generated in the third digit; if "POWER SAVING BASIC SETTING" is "SETTING 1," "00" is generated in the fourth and the fifth digits, respectively; if "SOUND BASIC SETTING" is "SETTING 2," "01" is generated in the sixth and seventh digits, respectively; and if "ACCESS CONTROL SETTING" is "OFF," "0" is generated in the eighth digit. At this point, a basic diagnostic code of "10100010" is generated in eight digits.

Figure 7:
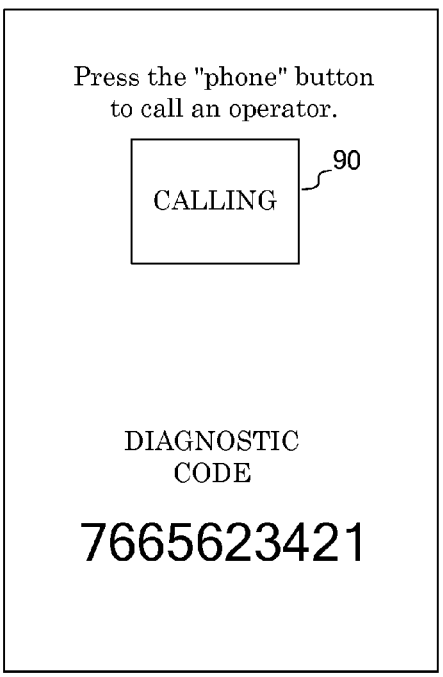
FIG. 7 shows the output screen image of a basic diagnostic code output to a diagnostic code generation terminal 10.

Then, the diagnostic code generation terminal 10 receives a phone call instruction from the user and, in response, places a phone call to the operator terminal 150 (Step S03). As shown in FIG. 7, a phone call icon 90 is displayed on the touch panel input unit 14 of the diagnostic code generation terminal 10 for receiving the phone call instruction from a user.

Then, the diagnostic code generation terminal 10 outputs a basic diagnostic code to the touch panel input unit 14 (Step S04). The basic diagnostic code is a diagnostic code representing the diagnosis result of a basic diagnosis item. For example, the basic diagnostic code is represented by an 8 digit diagnostic code "01100010" as described above, but may be represented by a decimal number "98" converted from "01100010." In this example, due to two basic diagnosis items, "COMMUNICATION STATUS" and "BASIC SET- TING," the diagnostic code is two digit number "98." In general, many other diagnoses of basic diagnosis items such as mail, applications, and the like are performed so that a basic diagnostic code may be of eight digits or more as shown in FIG. 7.

In the first embodiment, the diagnostic code generation terminal 10 and the operator terminal 150 are not required to be connected or to enable data communication with each other, but used in offline. Accordingly, it is not assumed that the value of a diagnostic code with a long digit number cannot be transmitted from the diagnostic code generation terminal 10 to the operator terminal 150. Thus, a user tells a diagnostic code with eight digits or more to an operator by reading a basic diagnostic code aloud through phone. An operator can reproduce the diagnostic result of a basic diagnosis item in the operator terminal 150 by inputting the diagnostic code to the operator terminal 150. (See the setting status reproduction process of FIG. 11 described hereinafter.)

However, when telling a diagnostic code of eight digits or more to an operator, a user may read an incorrect diagnostic code due to the too long digit number, leading to a wrong result. Then, the following process is further executed.

At the start, the diagnostic code generation terminal 10 sets the integer N for this process (Step S05).

Figure 8:
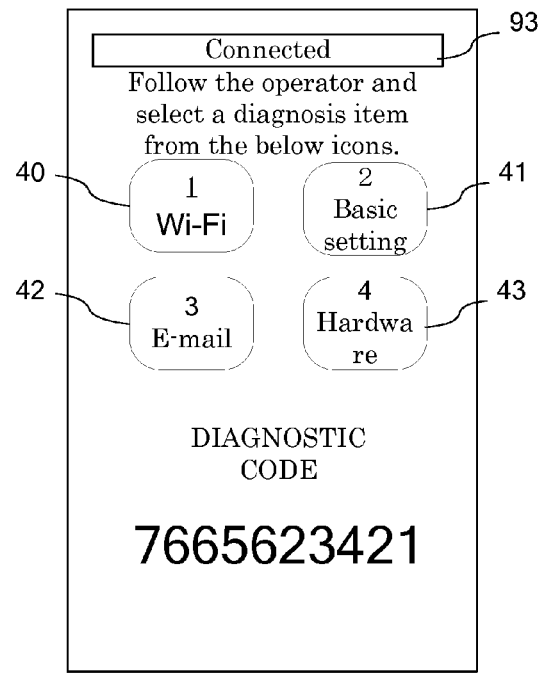
FIG. 8 shows the output screen image of an N=1 select object list output to a diagnostic code generation terminal 10.

Then, the select object output module 21 of the diagnostic code generation terminal 10 outputs an N=1 select object (Step S06). The N=1 select object is extracted from the N=1 select object list of FIG. 6. The select object output at N=1 is a select object such as "Wi-Fi", "BASIC SETTING", "E-MAIL", "HARDWARE", "OS", or "APPLICATION." As shown in FIG. 8, icons 40-43 corresponding to these select objects are output to the diagnostic code generation terminal 10.

At this time, if starting a phone call in the step S03, the user can verbally communicate with an operator through phone. (See the indication 93 of "CONNECTED" of FIG. 8.)" Accordingly, the operator learns the setting item that the user wishes to set or the content of trouble from the user and instructs the user through voice to select a predetermined select object corresponding to such a setting item or a trouble. For example, when a user tells an operator that the user cannot connect with a wireless LAN network, the operator instructs the user through phone to press the icon 40, "Wi-Fi" among these icons being displayed in FIG. 8 for performing diagnosis related to a wireless LAN network.

The diagnostic code generation terminal 10 determines whether or not a user conducts selecting operation for the output select object (Step S07). If it is determined that a user conducts selecting operation (Step S07: "YES"), the process is moved to the step S08. Until determining that a user conducts selecting operation (Step S07: "NO"), the diagnostic code generation terminal 10 repeats this process.

Then, the diagnostic code generation terminal 10 determines whether or not the select object for returning to selection at N=1 is selected (Step S08: "YES"). In this step (Step S08), in the case of N=1, the process is moved to the step S09 without the determination. Otherwise, the case of N≥2 will now be explained.

Then, the diagnostic code generation terminal 10 executes the selected item diagnosis process (Step S09). The selected item diagnosis process is a process extracting a diagnosis content corresponding to the selected diagnosis item and executing a diagnostic program corresponding to this diagnosis content. For example, when "Wi-Fi" is selected at N=1 as a select object, the Wi-Fi diagnosis content list of FIG. 5 is referred to execute a diagnostic program of the corresponding diagnosis content, in the same way of diagnosis of a basic diagnosis item. As a result, the diagnostic result of N=1 is obtained.

Selected Item Diagnosis Process

Figure 13:
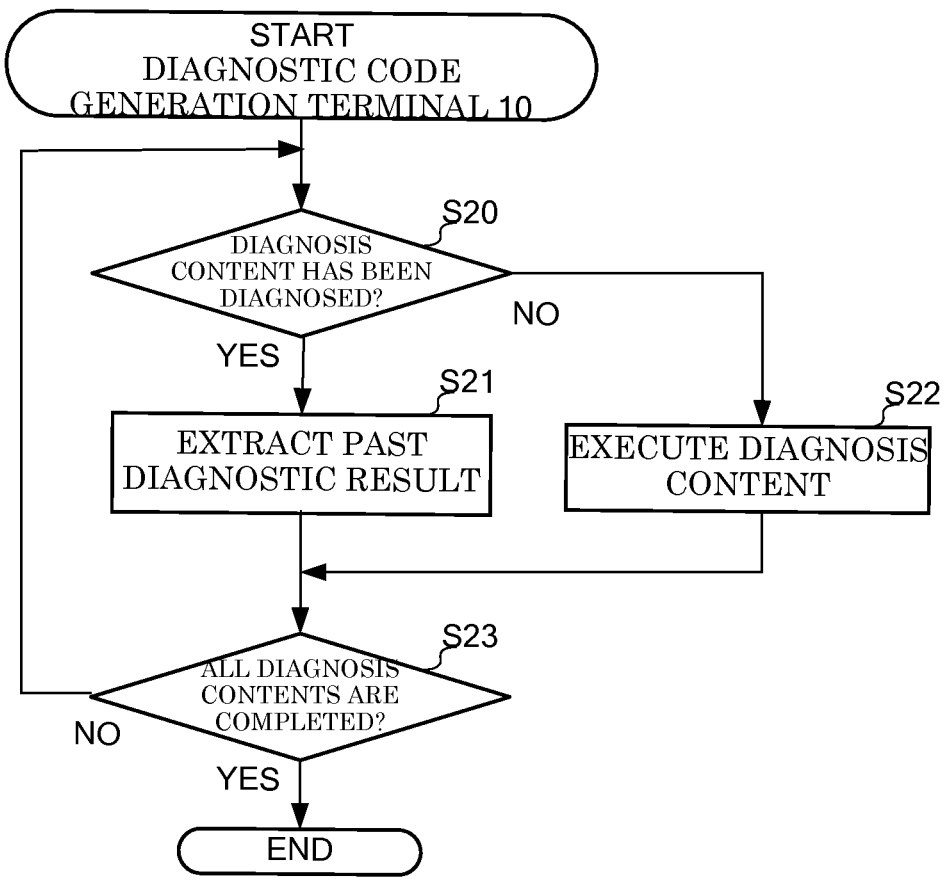
FIG. 13 shows the flow chart illustrating the selected item diagnosis process executed by a diagnostic code generation terminal 10.

The selected item diagnosis process executes a process eliminating diagnoses overlapping the past ones. Specifically, in the case of an N=1 diagnosis item, a diagnosis content executed for a basic diagnosis item is eliminated. The present process will be explained with reference to FIG. 13.

At the start, the diagnostic code generation terminal 10 determines whether or not the diagnosis content to be diagnosed at this time is a diagnosed diagnosis item (Step S20). For example, when "Wi-Fi" is selected at N=1, referring to the basic diagnosis content list of FIG. 4 and the Wi-Fi diagnosis content list of FIG. 5, "Wi-Fi SETTING" is included in both of a basic diagnosis item and a Wi-Fi diagnosis item. Then, the diagnosis content, "Wi-Fi SETTING" is determined as a diagnosed diagnosis content, and the process is moved to the step S21. Other diagnosis contents, "ACCESSIBLE SSID" and "HTTP PROXY SETTING" are first-time diagnoses, and then the process is moved to the step S22.

In the case of a diagnosed diagnosis content (Step S20: "YES"), the diagnostic code generation terminal 10 extracts the diagnostic result recorded in the past (Step S21). For example, if the diagnostic result of "Wi-Fi SETTING" is recorded as "ON" as the diagnostic result of the past basic diagnosis item, the diagnostic result is extracted.

On the other hand, if the diagnosis content is a first time diagnosis content (Step S20: "NO"), the diagnostic code generation terminal 10 performs diagnosis of the diagnosis content as usual (Step S22). Then, if all the diagnosis contents are completed (Step S23: "YES"), the process is ended. If another diagnosis content is left, the same process is executed for the next diagnosis content. Referring to FIG. 5, in the case of the diagnosis item, Wi-Fi, the process is completed when the three diagnosis contents are ended.

Then, the diagnostic code generation module 22 of the diagnostic code generation terminal 10 performs the diagnostic code regeneration process (Step S10). The diagnostic code generation process is a process including information on the past diagnostic code in a diagnostic code and regenerating a new diagnostic code of a not too many digit numbers, in generating a diagnostic code reflecting the result of a diagnosis item diagnosed at this time.

Diagnostic Code Regeneration Process

Figures 14, 15:
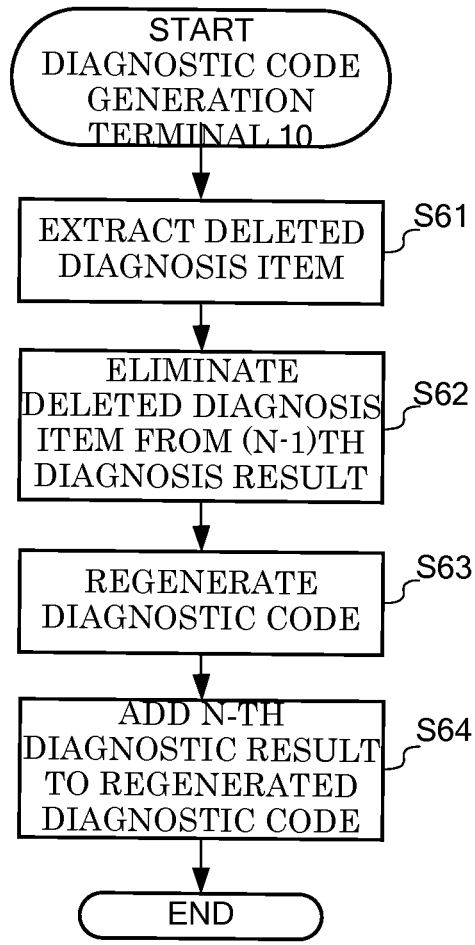
FIG. 14 shows the flow chart illustrating the diagnostic code regeneration process executed by a diagnostic code generation terminal 10.
FIG. 15 shows the deleted diagnosis item corresponding list stored in a diagnostic code generation terminal 10.

The diagnostic code regeneration process will be explained, with reference to FIG. 14. The diagnostic code generation module 22 refers to the deleted diagnosis item corresponding list to extract a deleted diagnosis item (Step S61). As shown in FIG. 15, the deleted diagnosis item is a diagnosis item associated with the deleted diagnosis item list. Specifically, this is an item preliminarily set as a diagnosis item unrelated to the diagnosis item diagnosed at this time. For example, if the diagnosis item selected at this time is "Wi-Fi," the deleted diagnosis items are "E-MAIL" and "APPLICATION" according to the deleted diagnosis item corresponding list. These diagnosis items are unrelated to the selected "Wi-Fi" that is determined to be required for diagnosis, and accordingly these diagnostic results are eliminated for diagnostic code generation to be conducted at this time. As a result, the decrease of the digit number of a diagnostic code is achieved.

Accordingly, the diagnostic result corresponding to deleted diagnosis items based on a diagnostic code obtained from the past diagnosis is eliminated (Step S62), and a diagnostic code is regenerated with only an uneliminated diagnosis item (Step S63). Specifically, when diagnoses of "E-MAIL" and "APPLICATION" have been performed in the past, these items are deleted diagnosis items in this diagnosis, and accordingly a diagnostic code with the diagnostic results deleted is regenerated. In the case of N=1, the diagnostic result corresponding to the deleted diagnosis item of a basic diagnostic code is eliminated, and diagnostic code is generated.

Then, the diagnostic code generation module 22 outputs a diagnostic code as a first diagnostic code, in which the diagnostic result of this diagnosis is added to the regenerated diagnostic code (Step S64). In the above-mentioned example, among the diagnostic results of diagnosis contents described in the Wi-Fi diagnosis content list, the codes of the diagnostic results of diagnosis contents "ACCESSIBLE SSID" and "HTTP PROXY SETTING" other than "Wi-Fi SETTING" are added.

In the diagnostic code regeneration process, the steps S61-S64 are not executed when no past diagnoses have been conducted.

Like the diagnostic code regeneration process, the N-th diagnosis item result may merely be an N-th diagnostic code, without including the diagnostic result of the past diagnostic code in this diagnostic code.

Figure 9:
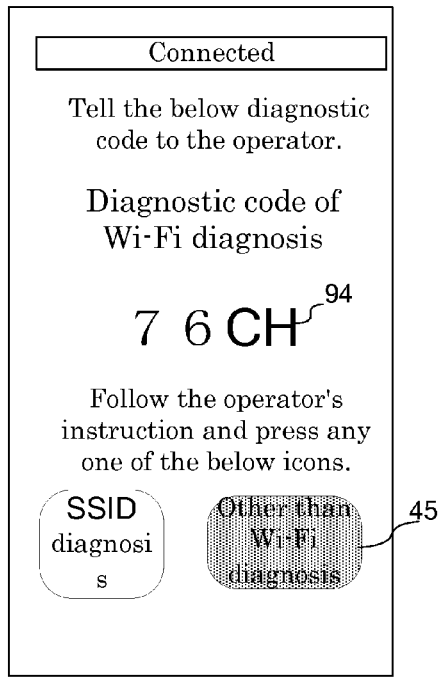
FIG. 9 shows the output screen image of a first diagnostic code output to a diagnostic code generation terminal 10.

Returning to FIG. 3, the diagnostic code generation terminal 10 displays (outputs) a first diagnostic code output in the diagnostic code regeneration process on the screen as shown in FIG. 9 (Step S11). FIG. 9 shows the display including a first diagnostic code 94 after Wi-Fi is selected as a select object and then diagnosed.

At this point so far, a first diagnostic code is displayed to a user so that the user can tell this first diagnostic code to an operator, instead of a basic diagnostic code. The process at the operator side will be explained with reference to FIGS. 11 and 12.

Setting Status Reproduction Process

Figure 11:
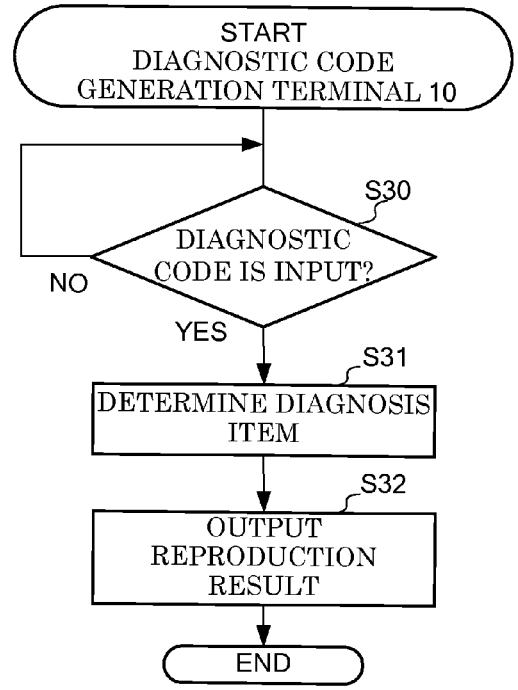
FIG. 11 shows the flow chart illustrating the setting status reproduction process executed by an operator terminal 150.
Figure 12:
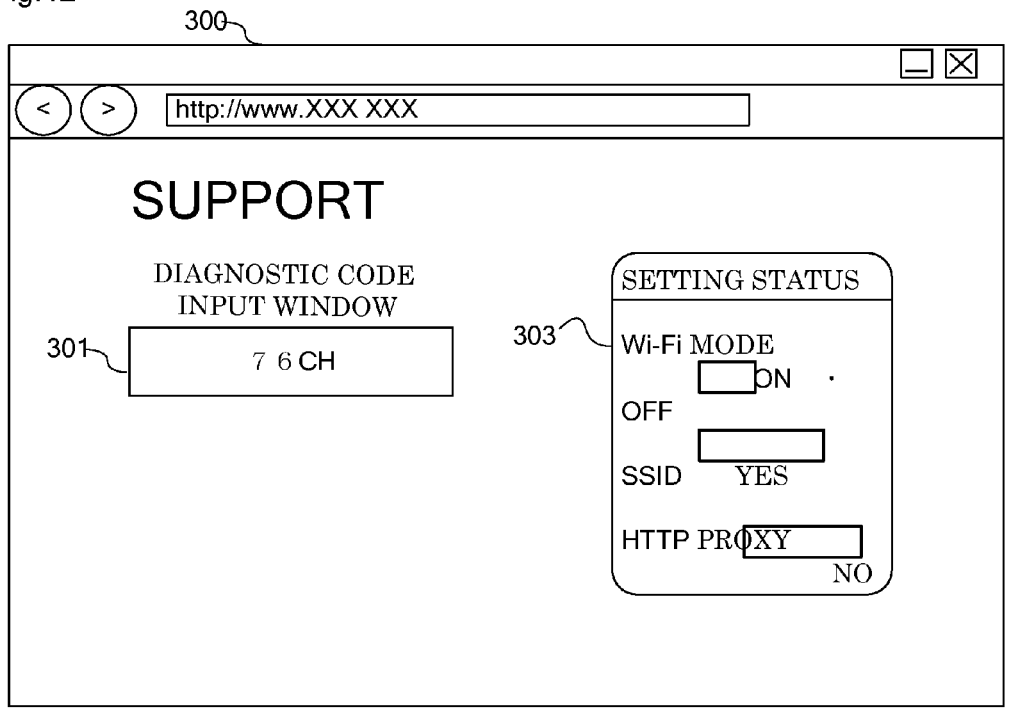
FIG. 12 shows the output screen image of a reproduced setting status output to an operator terminal 150.

FIG. 11 shows the setting status reproduction process executed by an operator terminal 150. At the start, an operator learns a first diagnostic code from a user and input the first diagnostic code to the operator terminal 150. FIG. 12 shows the screen image of an operator terminal 150. A diagnosis item is determined by inputting a first diagnostic code in the diagnostic code input window 301 of this screen (Step S31), and the setting status that is a diagnostic result is reproduced and displayed (output) on the setting status screen 303 (Step S32).

Like the diagnostic code generation terminal 10, the operator terminal 150 also stores the basic diagnosis content list and the Wi-Fi diagnosis content list (and other setting content list), and accordingly the setting status is reproduced by decoding a first diagnostic code. In the example of FIG. 12, the diagnostic status (Wi-Fi SETTING: "ON," ACCESSIBLE SSID: "YES," and HTTP PROXY SETTING: "OFF") are reproduced, corresponding to three diagnosis contents of the diagnosis item, Wi-Fi (see the Wi-Fi diagnosis content list of FIG. 5)

At this point, the first diagnostic code is a diagnostic code generated by being specified through user's selecting operation, but not a basic diagnostic code. In addition, the digit number of a first diagnostic code is reduced since useless diagnosis contents are eliminated from the diagnostic code.

Moreover, in the above-mentioned description, diagnosis of a basic diagnosis item is performed in the diagnostic code generation terminal 10 in order to explain that a first diagnostic code is more efficient as a code for completing diagnosis than the basic diagnostic code. However, the N=1 select object may be output straight away without performing diagnosis of a basic diagnosis item, and the processes after the step S05 may be executed. In this case, diagnosis of a basic diagnosis item is not performed, so that diagnoses unrelated to those required for support do not have to be performed, thereby enhancing the promptness of diagnosis.

Returning to FIG. 3, the diagnostic code generation terminal 10 displays a corresponding icon for receiving selecting operation of the next select object from a user (Step S12).

The next select object is extracted from the diagnosis item list of FIG. 17. The diagnosis item list is a list of the diagnosis item, which is hierarchized so that a detailed diagnosis of the first diagnosis item is the second diagnosis item, and a detailed diagnosis of the second diagnosis item is the third diagnosis item. Each diagnosis item in the diagnosis item list may be optionally extracted without depending on the hierarchy. (Since Wi-Fi is diagnosed by the past diagnosis, this diagnosis item is not extracted.) For example, the diagnosis item, "SSID" of the second diagnosis item and the diagnosis item, "OS" of the first diagnosis item may be extracted. As one example, the following example describes that a select object for diagnosing a subordinate diagnosis item is extracted when there is a problem on the superordinate diagnosis item in the (N+1)th select object extraction process of FIG. 16.

Then, the diagnostic code generation terminal 10 increments N (Step S13), and returns the process to the step S07. At this stage N=2, the selecting operation of the select object of the extracted diagnosis item is received (Step S07).

The process moves to the step S08 if selecting operation is conducted. The step S08 for N=2 will be explained using FIG. 9. In the step S08, the icon 45 "Other than Wi-Fi diagnosis" is output during output of a first diagnostic code. This is an icon used when diagnosis items other than Wi-Fi diagnosis (for example, BASIC SETTING, E-MAIL, HARDWARE, etc.) among first diagnosis items are diagnosed (or output as a selection window). This icon 45 is an icon output when Wi-Fi is diagnosed in N=1 diagnosis. When this icon 45 is selected from a user, the result of the step S08 becomes "YES", and the process returns to the step S05, in order to return to selection of N=1.

When selecting operation is conducted from the user, the setting content list of a corresponding diagnosis item is referred to execute the selected item diagnosis process in the same way for N=1 (the step S09). At this point, the diagnostic code generation terminal 10 stores not only the Wi-Fi diagnosis content list illustrated in FIG. 5 but also a diagnostic content list in each diagnosis item. Specifically, the first diagnosis item is provided with the basic setting diagnosis content list, the mail diagnosis content list, and the hardware diagnosis content list; the second diagnosis item is provided with the SSID diagnosis content list and the power saving setting detail list; and the third diagnosis item is provided with similar diagnosis content lists.

Then, in the case of N=2, the deleted diagnosis item corresponding list is referred to execute the diagnostic code regeneration process. At this point, the deleted diagnosis item corresponding list is referred to extract a deleted diagnosis item, and the deleted diagnosis item is eliminated from the diagnostic result of N=1 to regenerate a diagnostic code. The diagnostic result of N=2 is added to this diagnostic code to generate the second diagnostic code.

Figure 10:
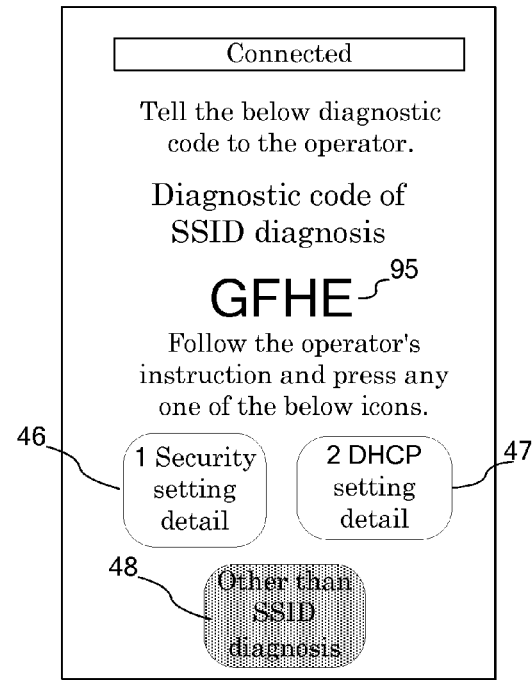
FIG. 10 shows the output screen image of a second diagnostic code output to a diagnostic code generation terminal 10.

A second diagnostic code regenerated in this manner is displayed on the diagnostic code generation terminal 10. FIG. 10 shows an example of the screen displaying a generated second diagnostic code on the diagnostic code generation terminal 10 as this diagnostic result. As shown in this FIG. 10, a select object output next from a diagnosis item list is extracted, and the icons 46, 47, and 48 corresponding to select objects of an N=3 diagnosis item are displayed in the same manner. Then, N is incremented, and the process returns to the step S07, the processes for N≥3 are executed in the same manner.

Even for a second diagnostic code, a third diagnostic code, or fourth or more diagnostic codes, the setting status can be reproduced by executing the setting status reproduction process in the operator terminal 150.

(N+1)th Select Object Extraction Process

The (N+1)th select object extraction process will be explained. This process is a process for extracting a select object output in the step S12 at N+1≥2.

At the start, the select object output module 21 of the diagnostic code generation terminal 10 extracts a preliminarily set select object (Step S06). Then, it is determined whether or not the N-th diagnosis content of an N diagnosis item includes the diagnosis item of "NO" (Step S51). If an N-th diagnosis content of N diagnosis item includes the diagnosis item of "NO" (Step S51: "YES"), the process is moved to the step S52.

For example, as the result of reproduction of a basic diagnostic code, if the diagnosis content "INTERNET ACCESSIBILITY" is "NO", "COMMUNICATION STATUS" is extracted as a diagnosis item (Step S51), and the diagnosis content "INTERNET ACCESSIBILITY" is extracted (Step S52).

Then, the select object output module 21 includes a subordinate diagnosis item of the extracted diagnosis item in an N+1 select object (Step S54). In other words, a subordinate diagnosis item of the diagnosis item including the extracted diagnosis content of "NO" is extracted as the next select object. The superordinate and the subordinate diagnosis items are determined by the diagnosis item list of FIG. 17. For example, when the setting status of the diagnosis content, "INTERNET ACCESSIBILITY" is "NO", the subordinate diagnosis item, "SSID" of the diagnosis item, "Wi-Fi" to which this diagnosis content belongs is included in an N+1 select object. This can urge a user to conduct selecting operation so as to perform a more detailed diagnosis for the result with a high possibility of failure based on the setting status "No."

Then, the select object output module 21 sets output of a subordinate item to be diagnosed as a highlighted object (Step S55).

The highlighted object may be an aspect displaying in colors different from other icons or an aspect deforming the shape of an icon to make it different from that of others. Accordingly, an operator tells the feature of a highlighted object to a user, thereby making it easier for a user to select a select object corresponding to the highlighted object.

On the other hand, if the N-th diagnosis content of an (N+1)th diagnosis item does not include the diagnosis item of "NO" (Step S51: "NO"), the process is moved to the step S53. In this case, the select object output module 21 sets output of a select object to return to selection of N=1 as a highlighted object (Step S53). Specifically, in this case, the setting status of "NO" does not exist in the past diagnosis. More specifically, no diagnoses with high possibility of failure have been found. Accordingly, output of a select object returning to the selection of N=1 as a highlighted object is set to diagnose other diagnosis items (or to select an icon making the result "YES" of the step S08).

The Second Embodiment

Extraction of Select Object from the Operator Terminal 150

In the second embodiment to be explained hereinafter, unlike the first embodiment, the diagnostic code generation terminal 10 and the operator terminal 150 are connected for enabling data communication with each other.

From the steps S70 to S74 of the diagnostic code generation process 2, the processes are the same only except the steps S01 to S05 of the diagnostic code generation process and N is changed to L. Therefore, the explanation is omitted.

In the step S75, the diagnostic code generation terminal 10 extracts and outputs an L=1 select object is extracted, but a select object is selected and extracted from the operator terminal 150.

Figure 18:
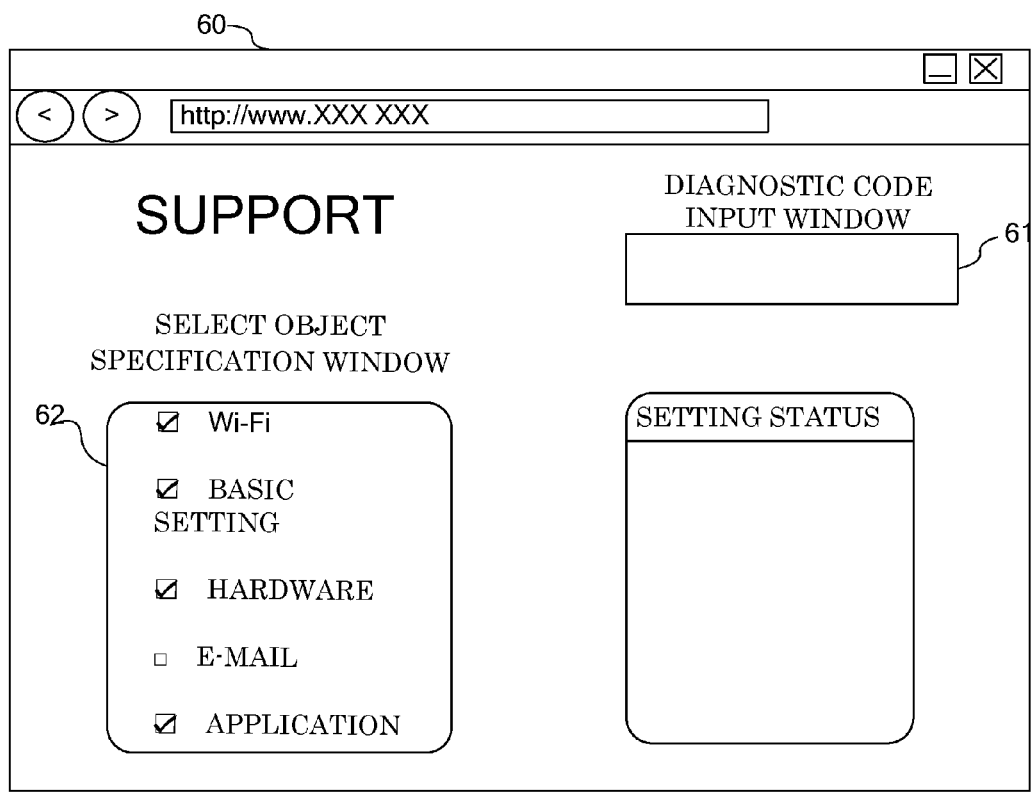
FIG. 18 is the output screen image of the select object specification window receiving input from an operator terminal 150 according to the second embodiment.
Figure 19:
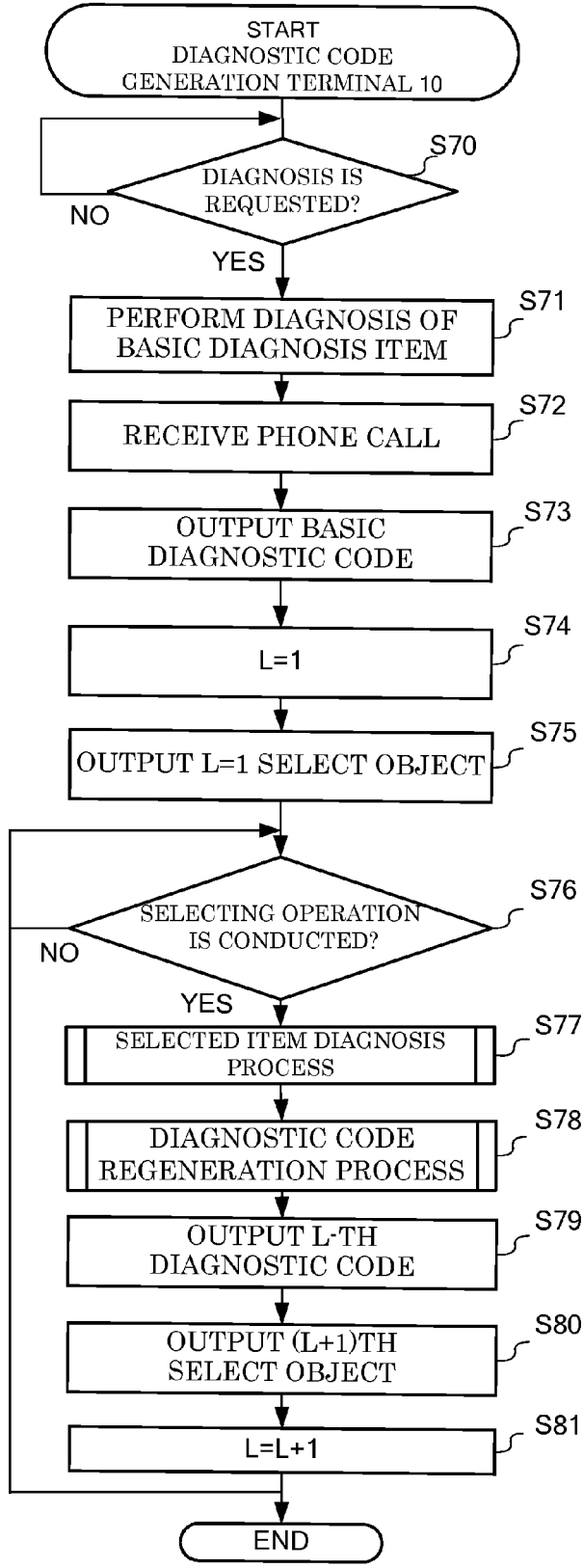
FIG. 19 shows the flowchart illustrating the diagnostic code generation process 2 performed by a diagnostic code generation terminal 10 according to the second embodiment.

FIG. 18 shows the screen image of an operator terminal 150 when the present process is executed. At this point, the select object specification window 62 is displayed on the operator terminal 150. The select object specification window 62 is a window specifying a select object displayed on the diagnostic code generation terminal 10, in which the select object corresponding to the checked diagnosis item is selected and extracted by checking the check boxes of diagnosis items such as "Wi-Fi" and "Basic setting."

In this way, an L=1 select object is extracted in the operator terminal 150, the diagnostic code generation terminal 10 receives the data of the extracted select object and outputs the select object to the touch panel input unit 14. In the example of FIG. 18, "Wi-Fi", "BASIC SETTING", "HARDWARE", and "APPLICATION" are extracted. The screen image of the diagnostic code generation terminal 10 corresponding to this screen is the same as that shown in FIG. 8.

In addition, the step S76 is executed in the same way of the step S07 of the diagnostic code generation process, but the step S08 does not exist in the diagnostic code generation process 2. The steps S77 to S81 are the same as S09 to S13.

In the diagnostic code generation process 2, a select object selected by an operator is extracted, but overlapped diagnosis contents are not diagnosed in the selected item diagnosis process. Accordingly, when selecting the diagnosis item, an operator does not have to determine whether or not the diagnosis content has already been diagnosed in the past.

Furthermore, in the diagnostic code regeneration process, a diagnostic code reflecting the past diagnostic result can be generated, so that the digit number of diagnostic code can be reduced, and the setting status desired by an operator can be reproduced every time a user selects the select object.

The Third Embodiment

Transmission of Diagnostic Code

In the third embodiment to be explained hereinafter, unlike the first embodiment, the diagnostic code generation terminal 10 and the operator terminal 150 are connected for enabling data communication with each other. The third embodiment executes the same process as the diagnostic code generation process of the first embodiment, only except the basic code output process of the step S04 and the output process of the N-th diagnostic code of the step S11. In the present embodiment, the basic code output process is the basic code transmission process, and the N-th diagnostic code output process is the N-th diagnostic code transmission process.

Specifically, the diagnostic code generation terminal 10 transmits a basic diagnostic code to the operator terminal 150. The operator terminal 150 that has received a basic diagnostic code executes the setting status reproduction process. "DIAGNOSTIC CODE IS INPUT?" in the step S30 of the setting status reproduction process of FIG. 11 according to the present embodiment is "DIAGNOSTIC CODE IS RECEIVED?." Thus, the operator terminal 150 receives a basic diagnostic code, and executes the processes from the steps S31 to output a reproduction result (Step S32).

The above-described process is not limited to a basic diagnostic code but is executed for an N-th diagnostic code in the step S11.

According to the third embodiment, like the first embodiment, private information of the user terminal cannot be leaked unlike screen transfer, errors in reproduction of the setting status less likely occur, and no useless diagnoses are performed, in order to check the setting status of a user terminal. In other words, even in the third embodiment, leakage of private information is prevented to use a diagnostic code, and errors in reproduction of the setting status less likely occur. In addition, since a diagnosis item is limited by a selection window, useless diagnoses can be prevented. In particular, in the present embodiment, unlike the first embodiment and the second embodiment, a user allows an operator to reproduce the setting status without considering a diagnostic code. Thus, the present embodiment has a feature not requiring awareness of the digit number of a diagnostic code.

To achieve the means and functions as described above, a computer (including a CPU, an information processor, and various terminals) reads and executes a predetermined program. For example, a program is provided in forms recorded in a computer-readable record medium such as a flexible disk, a CD (CD-ROM, etc.), and a DVD (DVD-ROM, DVD-RAM, etc.). In this case, a computer reads a program from a record medium, forwards the program to internal or external storage to store the program therein, and executes the program. For example, the program may be preliminarily recorded in a memory device (record media) such as a magnetic disk, an optical disk, and a magnetic optical disk, and then provided from the memory device to a computer through a communication line.

The embodiments of the present invention are described above, but the present invention is not limited to these above-mentioned embodiments. The effects described in the embodiments of the present invention are merely listed as the most suitable effects produced from the present invention. The effect of the present invention is not limited to those described in the embodiments of the present invention.

REFERENCE SIGNS LIST 1 diagnostic code generation system
3 public line network
10 diagnostic code generation terminal
100 operator server
150 operator terminal

The invention claimed is:

1. A diagnostic code generation terminal reproducing the setting status comprising:
  a select object output module receiving input from a user by outputting a select object for limiting a diagnosis item of the diagnostic code generation terminal to the diagnostic code generation terminal;
  a diagnosis item performing module determining a diagnosis item corresponding to the select object in accordance with the input from the user and performing diagnosis of the determined diagnosis item; and
  a diagnostic code generation module generating a diagnostic code for reproducing the setting status of the diagnostic code generation terminal by inputting a diagnostic code reflecting the diagnostic result of a performed diagnosis to an operator terminal,
  wherein the operator terminal is located remotely from the diagnostic code generation terminal and performs a support function for the user of the diagnostic code generation terminal,
  wherein the diagnostic code generation terminal is constructed and arranged to:
    prior to receiving input from the user, perform a basic diagnosis on a first range of functions of the diagnostic code generation terminal to generate a first diagnostic code consisting of a first number of characters,
    form the first diagnostic code by concatenating a series of binary numbers, each binary number representing a setting status of a particular setting of the diagnostic code generation terminal; and
    maintain a list of deleted diagnosis items to be eliminated from subsequent diagnostic tests because they have already been performed,
  wherein the determined diagnosis item specifies a second range of functions of the diagnostic code generation terminal, wherein the diagnostic code consists of a second number of characters, and wherein the second number of characters is less than the first number of characters.

2. The diagnostic code generation terminal according to claim 1, wherein the operator terminal is located remotely from the diagnostic code generation terminal and performs a support function for the user of the diagnostic code generation terminal.

3. A computer program product including a non-transitory computer usable medium having a set of instructions physically embodied therein, which, when executed by a processor, cause the processor to perform a diagnostic method reproducing the setting status of a diagnostic code generation terminal at an operator side, the method comprising:
  a select object output step of receiving input from a user by outputting a select object for limiting a diagnosis item of the diagnostic code generation terminal to the diagnostic code generation terminal;
  a diagnosis item performing step of determining a diagnosis item corresponding to the select object in accordance with the input from the user and performing diagnosis of the determined diagnosis item;
  a diagnostic code generation step of generating a diagnostic code reflecting the result of the performed diagnosis; and
  reproducing the setting status of the diagnostic code generation terminal by inputting a diagnostic code to an operator terminal,
  wherein the operator terminal is located remotely from the diagnostic code generation terminal and performs a support function for the user of the diagnostic code generation terminal,
  wherein the method further comprises, prior to the step of receiving input from the user, performing a basic diagnosis on a first range of functions of the diagnostic code generation terminal to generate a first diagnostic code consisting of a first number of characters,
  forming the first diagnostic code by concatenating a series of binary numbers, each binary number representing a setting status of a particular setting of the diagnostic code generation terminal,
  wherein the determined diagnosis item specifies a second range of functions of the diagnostic code generation terminal, wherein the diagnostic code consists of a second number of characters, and wherein the second number of characters is less than the first number of characters, and wherein the method further comprises maintaining a list of deleted diagnosis items to be eliminated from subsequent diagnostic tests because they have already been performed.

4. The computer program product according to claim 3, wherein the operator terminal is located remotely from the diagnostic code generation terminal and performs a support function for the user of the diagnostic code generation terminal.

5. A diagnostic method reproducing the setting status of a diagnostic code generation terminal at an operator side, comprising the steps of:

receiving input from a user by outputting a select object for limiting a diagnosis item of the diagnostic code generation terminal to the diagnostic code generation terminal;

determining a diagnosis item corresponding to the select object in accordance with the input from the user and performing diagnosis of the determined diagnosis item;

generating a diagnostic code reflecting the result of the performed diagnosis; and reproducing the setting status of the diagnostic code generation terminal by inputting the diagnostic code to an operator terminal, wherein the operator terminal is located remotely from the diagnostic code generation terminal and performs a support function for the user of the diagnostic code generation terminal, wherein the method further comprises, prior to the step of receiving input from the user, performing a basic diagnosis on a first range of functions of the diagnostic code generation terminal to generate a first diagnostic code consisting of a first number of characters, wherein the determined diagnosis item specifies a second range of functions of the diagnostic code generation terminal, wherein the diagnostic code consists of a second number of characters, and wherein the second number of characters is less than the first number of characters, and wherein the method further comprises:

forming the first diagnostic code by concatenating a series of binary numbers, each binary number representing a setting status of a particular setting of the diagnostic code generation terminal; and maintaining a list of deleted diagnosis items to be eliminated from subsequent diagnostic tests because they have already been performed.

6. The diagnostic method according to claim 5, wherein in the step of receiving input from the user, after performing one diagnosis, input is received from a user by outputting a corresponding select object so as to perform diagnosis of a subordinate diagnosis item of the one diagnosis.

7. The diagnostic method according to claim 5, wherein in the step of receiving input from the user, after performing one diagnosis when the diagnosis result has a problem, input is received from a user by outputting a corresponding select object so as to perform diagnosis of a subordinate diagnosis item of the one diagnosis.

8. The diagnostic method according to claim 5, wherein the step of generating a diagnostic code includes the step of regenerating a diagnostic code including information on the past diagnosis by adding the result of the diagnosis to the generated diagnostic code.

9. The diagnostic method according to claim 5, further comprising the diagnostic code generation terminal placing a telephone call to an operator of the operator terminal to allow the user to verbally read the first diagnostic code to the operator of the operator terminal.

10. The diagnostic method according to claim 9, wherein the step of receiving input from the user is performed in response to the operator of the operator terminal failing to receive all characters of the first diagnostic code correctly.

\* \* \* \* \*